United States Patent [19]

Kononov et al.

[11] Patent Number: 5,452,879
[45] Date of Patent: Sep. 26, 1995

[54] APPARATUS FOR PLACEMENT OF AERIAL CABLE WITH ELEVATIONALLY ADJUSTABLE BULLWHEEL ASSEMBLY AND MOVABLE WORKER'S PLATFORM

[75] Inventors: Leon Kononov, Denver, Colo.; Robert A. Young, Clayton, Calif.

[73] Assignee: Holan Manufacturing, Inc., Westminster, Colo.

[21] Appl. No.: 122,721

[22] Filed: Sep. 15, 1993

[51] Int. Cl.⁶ .................................................. E21C 29/16
[52] U.S. Cl. ........................................................ 254/134.3 R
[58] Field of Search ................. 254/134.3 R, 134.3 PA, 254/134.3 FT, 413–417, 389

[56] References Cited

U.S. PATENT DOCUMENTS

| | | |
|---|---|---|
| 3,103,345 | 9/1963 | Eitel . |
| 3,226,087 | 12/1965 | Eitel . |
| 3,279,758 | 10/1966 | Eitel . |
| 3,291,256 | 12/1966 | Eitel . |
| 3,300,191 | 1/1967 | Leigh . |
| 3,319,935 | 5/1967 | Eitel et al. . |
| 3,326,529 | 6/1967 | Migeot . |
| 3,336,002 | 8/1967 | Leigh et al. . |
| 3,605,941 | 9/1971 | Edwards . |
| 5,096,163 | 3/1992 | Swearingen .............. 254/134.3 R |

Primary Examiner—Robert C. Watson
Attorney, Agent, or Firm—Flehr, Hohbach, Test, Albritton & Herbert

[57] ABSTRACT

An apparatus for placing aerial cable from a cable reel. The apparatus includes a wheeled platform having a front and rear. A boom structure having an axially extending outer end is provided and a worker's platform is mounted to the outer end of the boom structure. A boom support structure carries the boom structure and is rotatably mounted on the wheeled platform for rotation about a vertical axis. The boom structure and the boom support structure are constructed to permit the worker's platform to be moved toward and away from the wheeled platform, raised and lowered with respect to the wheeled platform and rotated with respect to the wheeled platform. A lifting apparatus is mounted on the wheeled platform for supporting a cable reel at the rear of the wheeled platform. A bullwheel assembly is mounted on the wheeled platform forward of the boom support structure for guiding cable from the cable reel. The bullwheel assembly has upper and lower sections and a mounting assembly for supporting the upper section with respect to the lower section to permit castering of the upper section with respect to the lower section. The bullwheel mounting assembly includes an actuator for elevating the upper section to provide additional clearance for the cable passing from the bullwheel assembly.

18 Claims, 4 Drawing Sheets

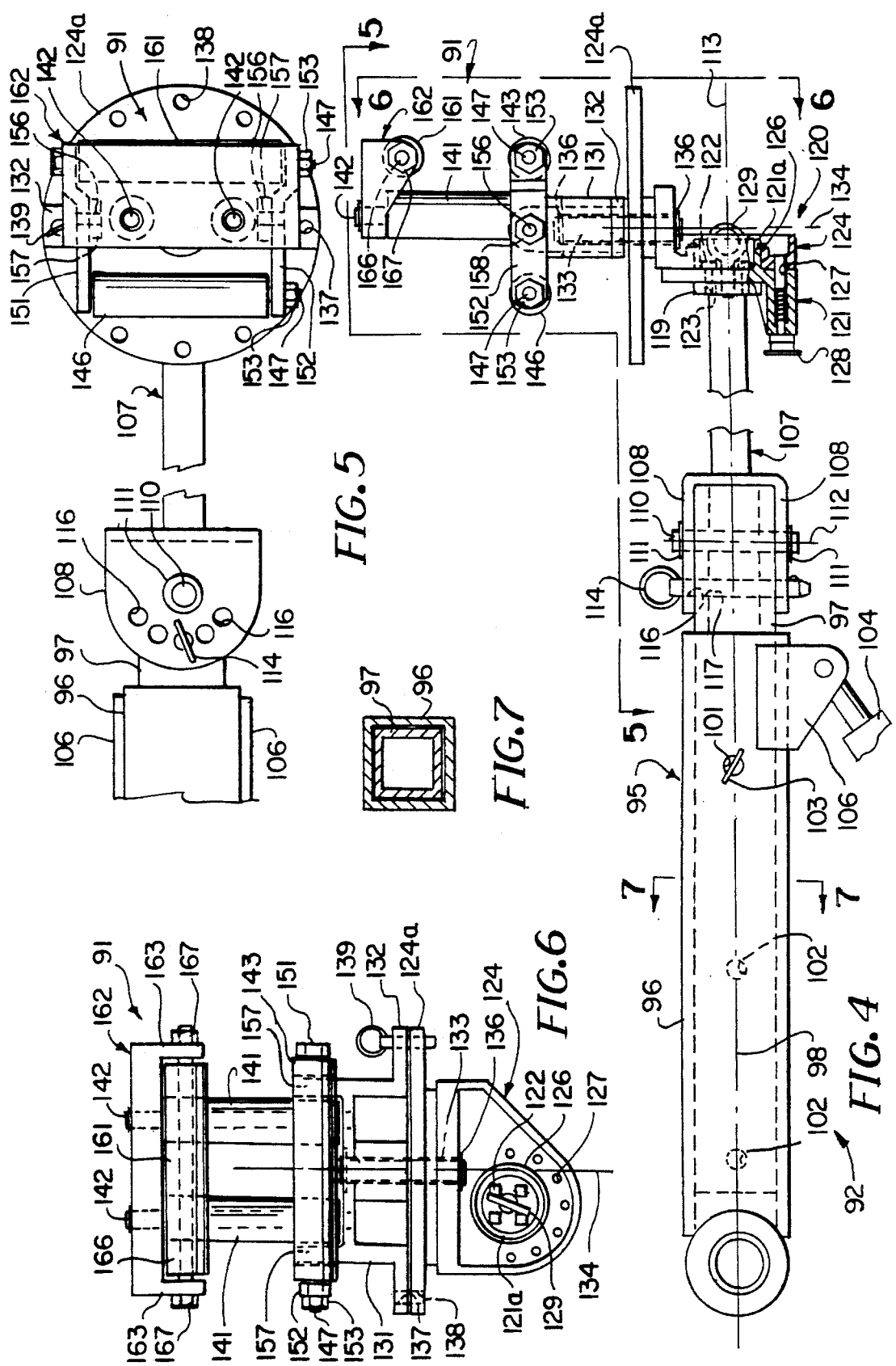

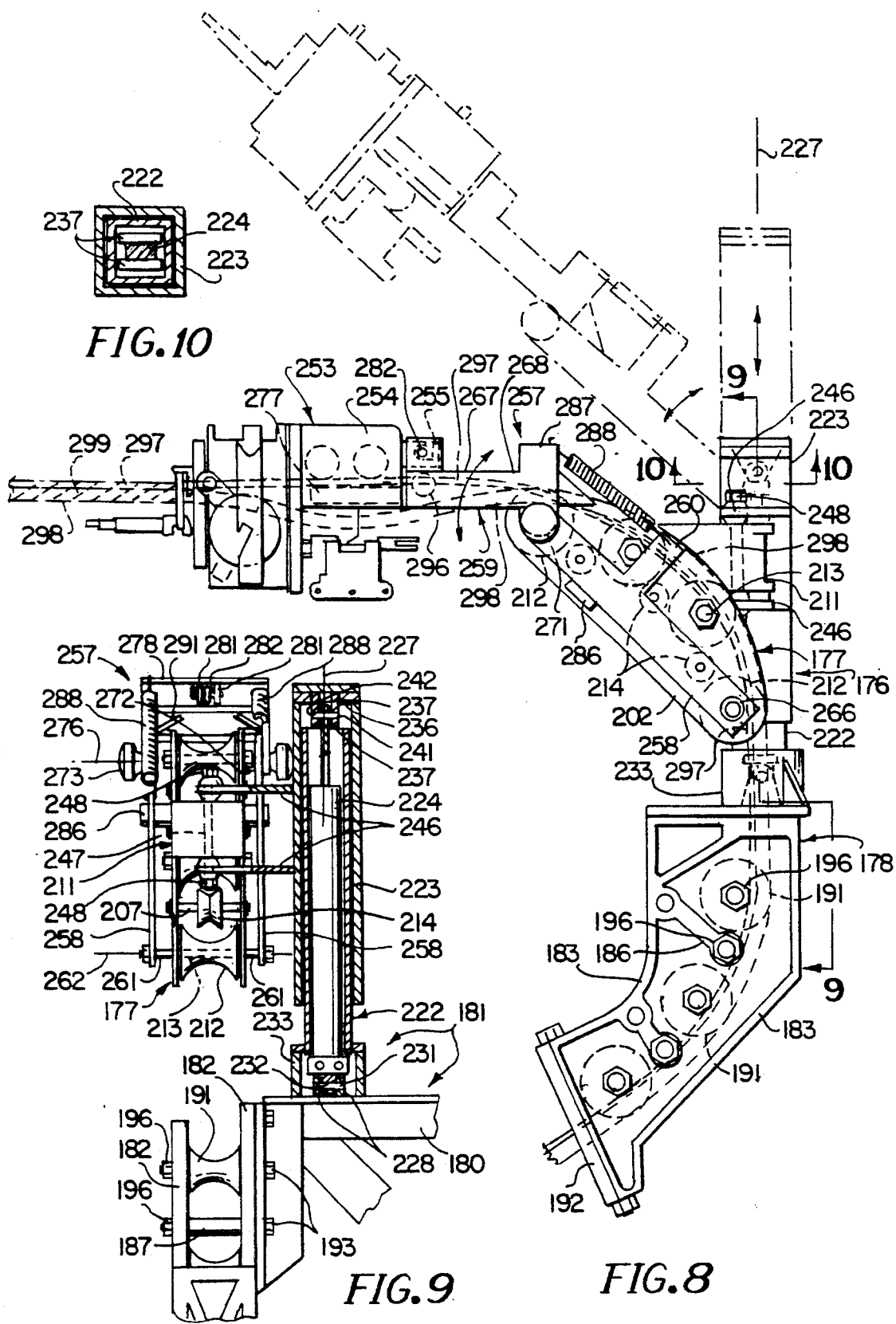

APPARATUS FOR PLACEMENT OF AERIAL CABLE WITH ELEVATIONALLY ADJUSTABLE BULLWHEEL ASSEMBLY AND MOVABLE WORKER'S PLATFORM

This invention relates to a cable guiding apparatus and more particularly to a cable guiding apparatus of the type adapted for use in placing aerial cable, messenger and the like.

Motorized and other wheeled vehicles with swivelable boom structures, castering bullwheel assemblies (See U.S. Pat. No. 3,103,345) and movable fairlead assemblies (See U.S. Pat. Nos. 3,226,087 and 3,300,191) have been provided for placing aerial cable. Cables are now being placed, however, which have diameters in excess of three inches and can weigh six to seven pounds per foot. Governmental regulations require that these cables be strung at greater distances from the pavement than previously required, these distances sometimes exceeding 30 feet. It has been found that the vehicles currently provided have difficulty handling these large and heavy cables and placing them at these greater distances. In addition, these vehicles do not permit a lashing apparatus to be easily coupled to the bullwheel assembly for use as a prelasher and removed therefrom if prelashing is not required and further require any towline connected to an offboard lasher to be moved from one side of the vehicle to the other when switching cable placement from one side of the vehicle to the other. Because of the foregoing, there is a need for a new and improved apparatus for the placement of aerial cable which overcomes the above named disadvantages.

In general, it is an object of the present invention to provide a new and improved apparatus for the placement of aerial cable.

Another object of the invention is to provide an apparatus of the above character which is particularly adapted for use in placing relatively large and heavy cables.

Another object of the invention is to provide an apparatus of the above character which can place cable a distance from the pavement sufficient to meet current governmental regulations.

Another object of the invention is to provide an apparatus of the above character in which the bullwheel assembly can be elevated to permit the cable to clear the heel of the boom structure when passing from one side thereof to the other.

Another object of the invention is to provide an apparatus of the above character in which a rack assembly is provided for pivotably mounting a lashing apparatus to the bullwheel assembly so that the lashing apparatus approximates the arc of the cable passing from the bullwheel assembly and through the lashing apparatus.

Another object of the invention is to provide an apparatus of the above character in which the lashing apparatus can be decoupled from the bullwheel assembly for use on aerial placed strand for lashing cable thereto.

Another object of the invention is to provide an apparatus of the above character in which the towline connected to the offboard lashing apparatus need not be disconnected and reattached to the vehicle when moving cable placement from one side of the vehicle to the other.

Another object of the invention is to provide an apparatus of the above character in which the worker's platform mounted to the end of the boom structure can be moved from one side of the boom structure to the other so as to provide the boom structure with additional reach.

Another object of the invention is to provide an apparatus of the above character in which the fairlead assembly mounted to the end of the boom structure can be adjusted with respect to four axes to facilitate the reach of the boom structure.

Additional objects and features of the invention will appear from the following description from which the preferred embodiments are set forth in detail in conjunction with the accompanying drawings.

FIG. 4 is a side elevational view, partially cross-sectioned, taken along the line 4—4 of FIG. 3.

FIG. 5 is a top plan view taken along the line 5—5 of FIG. 4.

FIG. 6 is a front elevational view taken along the line 6—6 of FIG. 4.

FIG. 7 is a cross-sectional view taken along the line 7—7 of FIG. 4.

FIG. 8 is an enlarged side elevational view of the adjustable bullwheel assembly shown in FIG. 1.

FIG. 9 is a cross and side elevational view, partially cut away and without inclusion of the lashing apparatus, taken along the line 9—9 of FIG. 8

FIG. 10 is a cross-sectional view taken along the line 10—10 of FIG. 8.

Figure 1:
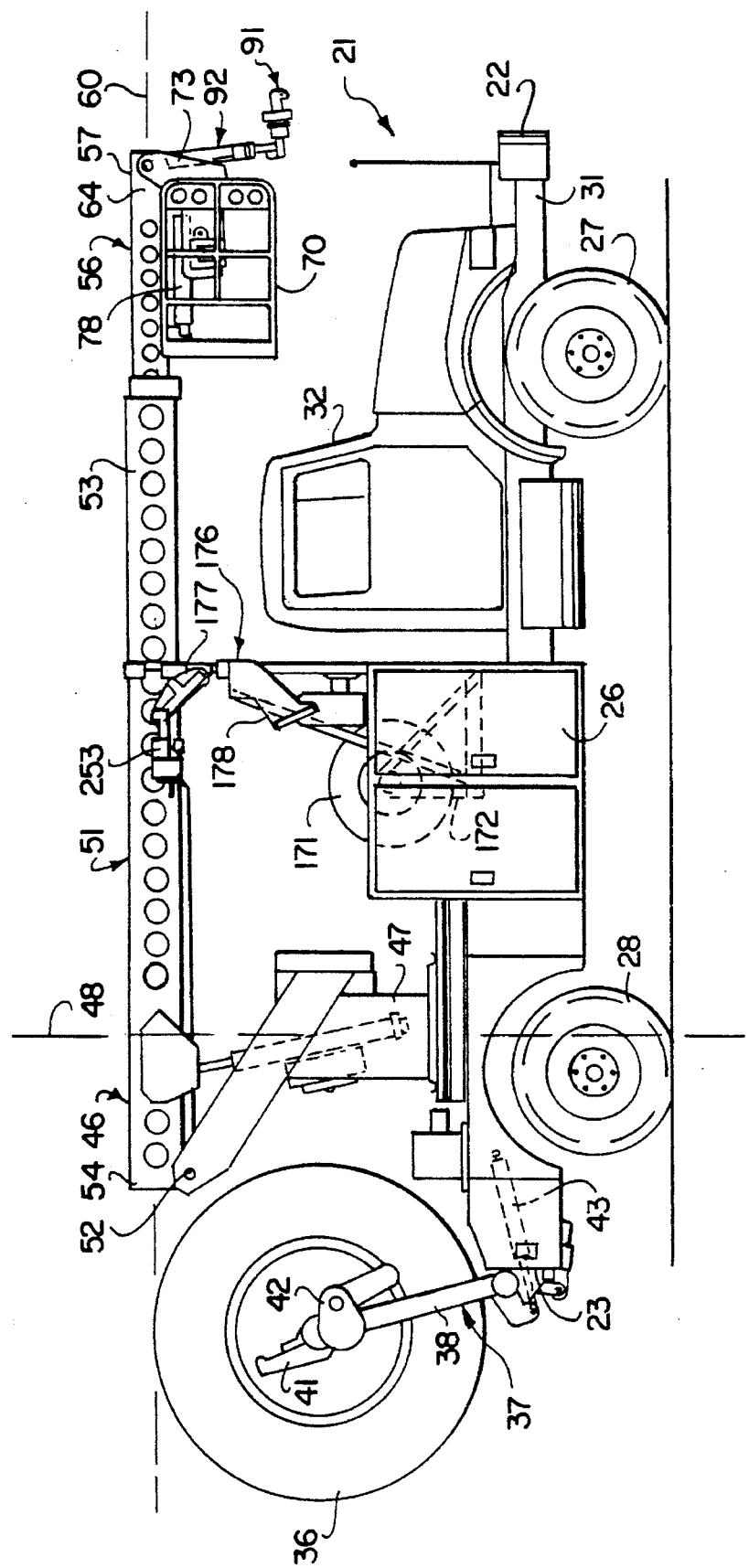
FIG. 1 is a side elevational view of an apparatus for placing aerial cable incorporating the present invention.

In general, the apparatus of the present invention is for placing aerial cable from a cable reel and includes a wheeled platform having a front and rear. A boom structure having an axially extending outer end is provided and a worker's platform is mounted to the outer end of the boom structure. A boom support structure carries the boom structure and is rotatably mounted on the wheeled platform for rotation about a vertical axis. The boom structure and the boom support structure are constructed to permit the worker's platform to be moved toward and away from the wheeled platform, raised and lowered with respect to the wheeled platform and rotated with respect to the wheeled platform. Means is mounted on the wheeled platform for supporting a cable reel at the rear of the wheeled platform. A bullwheel assembly is mounted on the wheeled platform forward of the boom support structure for guiding cable from the cable reel. The bullwheel assembly has upper and lower sections and means for supporting the upper section with respect to the lower section to permit castering of the upper section with respect to the lower section. The support means of the bullwheel assembly includes means for elevating the upper section to provide additional clearance for the cable passing from the bullwheel assembly. More in particular, the apparatus for placement of aerial cable of the present invention consists of a self-propelled vehicle 21 having a front 22 and a rear 23 and first and second sides 26 (See FIG. 1). Vehicle 21 includes front and rear wheels 27 and 28 upon which a longitudinally extending framework or platform 31 is mounted. A conventional cab 32 is mounted on front 22 of the vehicle and contains means (not shown) for supplying motive power to wheels 27 and 28.

Vehicle 21 is capable of carrying a conventional cable reel 36 onto which aerial cable is wound and has a reel lifting apparatus 37 generally of the type disclosed in U.S. Pat. No. 5,366,171 which serves as means mounted on platform 31 for supporting cable reel 36 at rear 23 of vehicle 21. Lifting apparatus 37 includes first and second arms 38 pivotally mounted to platform 31 and having lifting claws 41 at the respective ends thereof. A motor and brake assembly 42 is carried by one of the arms. At least one hydraulic actuator 43 is mounted to rear 23 and is included within the means for pivoting arms 38 about an axis generally perpendicular to the longitudinal axis of the vehicle. In this manner, cable reel 36 can be lifted onto the vehicle.

Lifting equipment 46 is mounted near the rear of platform 31. The lifting equipment can be of any suitable type such as one with an extensible boom structure of the type shown in the drawings or in the alternative one with an articulated boom structure well known to those skilled in the art. Lifting equipment 46 is provided with a load or boom supporting structure or turret 47 which is mounted upon the platform for rotation about a vertical axis 48. An axially extending boom structure 51 is carried by turret 47 for swiveling about vertical axis 48 and rotation about a horizontal axis formed by pivot shaft 52. Extensible boom structure 51 is provided with an outer sleeve section 53 having one end with a heel 54 mounted to the turret and an inner extensible or telescoping section 56 carried by section 53 having an outer end 57 which extends along a longitudinal axis 60 and has opposite first and second sides 63 and 64. Means which includes hydraulic actuator 67 is provided for raising and lowering outer end 57 about the horizontal axis of pivot shaft 52. A drive motor or cylinder (not shown) is provided for extending or retracting distal telescoping boom section 56 with respect to proximal boom section 53. As so constructed, turret 47 and boom structure 51 permit outer end 57 to be moved toward and away from wheeled platform 31, raised and lowered with respect to the wheeled platform and rotated about axis 48 with respect to the wheeled platform.

Figure 3:
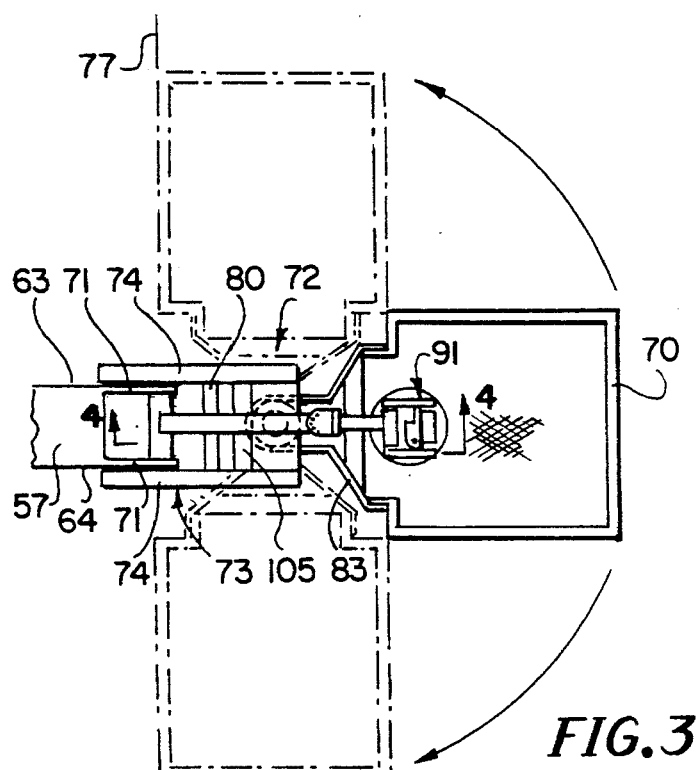
FIG. 3 is a top plan view of the outer end of the boom structure shown in FIG. 2.
Figure 2:
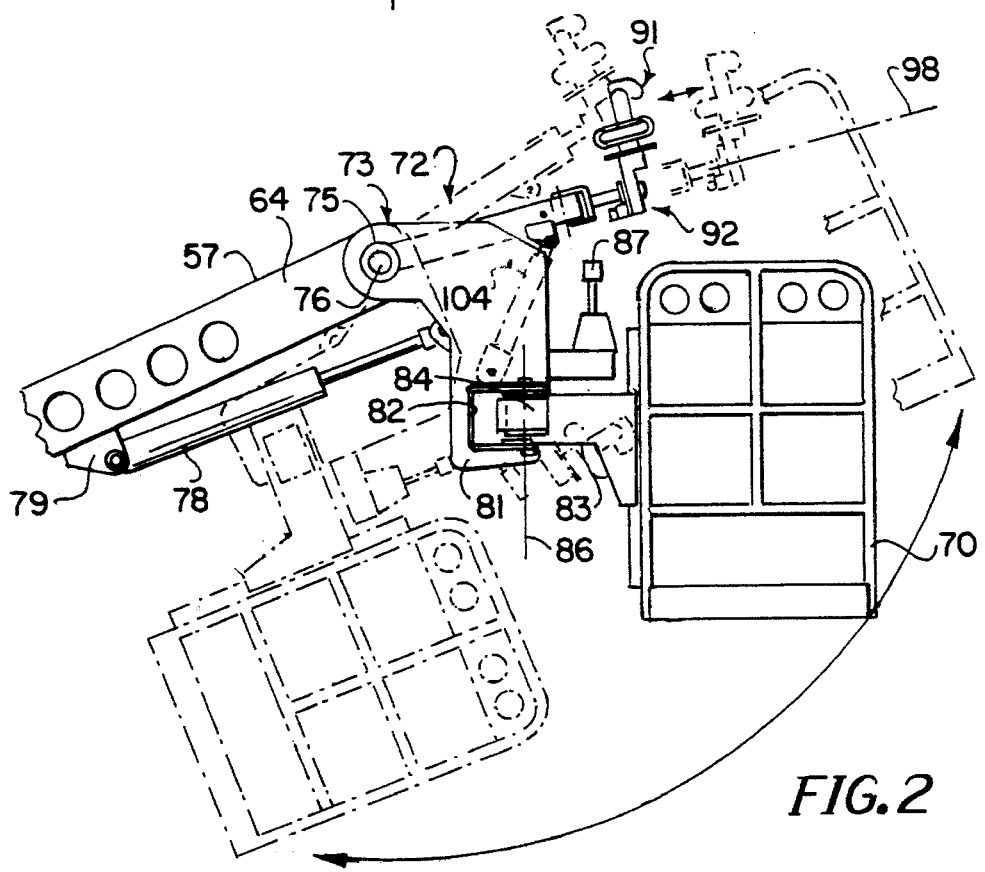
FIG. 2 is an enlarged side elevational view of the outer end of the boom structure shown in FIG. 1.

A worker's or operator's platform or basket 70 is carried by free outer end 57 of the boom structure (See FIGS. 1 through 3). In this regard, outer end 57 is formed with first and second horizontally spaced-apart bracket arms 71. Means in the form of basket mounting assembly 72 is provided for mounting basket 70 on outer end 57 and includes a first bracket member or cheeks 73 having first and second horizontally spaced-apart cheek sections 74 at the proximal end thereof for mounting the basket to outer end 57. More specifically, cheek sections 74 are juxtaposed along the outside of bracket arms 71 and pivotably connected by bushings 75 to a first pivot means or pin 76 carried transversely by outer end 57 and extending perpendicularly between and through bracket arms 71. In this manner, cheeks 73 are pivotable upwardly or downwardly about a transverse or horizontal axis 77 extending through pin 76 and perpendicular to longitudinal axis 60.

A hydraulic actuator 78 is mounted at one end to a bracket 79 formed on the bottom surface of outer end 57 and at the other end to a bracket 80 extending between sections 74 on the inner side of cheeks 73 and serves as means for raising and lowering basket 70 about horizontal axis 77 from an at-home position with respect to axis 77, shown generally in solid lines in FIG. 1, to an operational position with respect to axis 77, shown generally in solid lines in FIG. 2. In a manner known to those skilled in the art, actuator 78 is controlled to retain basket 70 in a generally horizontal position throughout the movement of boom structure 51. In this capacity, actuator 78 acts as a slave cylinder and is hydraulically connected to a master or control cylinder, not shown in the drawings, carried by turret 47 and the proximal end of the boom structure.

Basket mounting assembly 72 permits basket 70 to be disposed on one side 63 or 64 of outer end 57 and includes means for moving basket 70 from that side to other side and vice versa as illustrated in FIG. 3. In connection therewith, cheeks 73 have a C-shaped free or distal end 81 formed with a recess 82 therein. A second bracket member 83 is mounted to the side of basket 70 and is carried by distal end 81. The basket moving means includes a pivot and drive assembly in the form of any suitable basket rotator 84, such as Model No. PHI-3.8-180-V-H manufactured by Helac of Enumclaw, Washington, mounted within recess 82 of first bracket distal end 81 for rotation about an axis 86 extending through the basket rotator orthogonal to horizontal axis 77. Second bracket member 83 is mounted to basket rotator 84 so as to permit basket 70 to swing about axis 86 and, in this manner, basket rotator 84 also serves as means for swinging or rotating the basket about axis 86. Basket 70 is stored in an at-home position on either side of outer end 57 for transport, as shown in FIG. 1 where the basket is disposed on second side 64 thereof.

A joy stick 87 is connected to actuator 67, the drive motor for extending boom section 56 and to basket rotator 84 and is included within the means of controlling the position of basket 70 relative to turret 47 and outer end 57.

A fairlead assembly 91 is carried by outer end 57 of boom structure 51 for guiding cable as it is being placed. Lifting equipment 46 is provided with a fairlead mounting or jib assembly 92 which serves as means for mounting fairlead assembly 91 in the vicinity of basket 70 (See FIGS. 1 through 6). Jib assembly 92 shares pin 76 with basket mounting assembly 72 and includes an axially-extending member 95 formed from outer sleeve section 96 and inner extensible or telescoping section 97. Sleeve section 96 has one end which extends between bracket arms 71 and is pivotably joined by a sleeve bearing, not shown in the drawings, to pin 76 for pivoting at its other end about transverse axis 77 independent of cheeks 73. Telescoping section 97 is slidably carried by section 96 and as such is pivotably coupled to pin 76. Section 97 can extend outwardly from pin 76 and said other end of sleeve section 96 along a longitudinal axis 98 disposed perpendicular to transverse axis 77. Sections 96 and 97 are each square in cross-section, as shown in FIG. 7, so as to preclude relative rotation thereof about axis 77.

Means for manually positioning section 97 longitudinally with respect to section 96 is provided and includes a transverse bore 101 provided in outer section 96 and a plurality of spaced-apart transverse bores 102 provided in inner section 97 which are capable of being cooperatively aligned with bore 101. A ball lock pin 103 can be manually disposed within an aligned pair of bores 101 and 102 for fixing sections 96 and 97 in a predetermined longitudinal relationship. It should be appreciated that a conventional hydraulic actuator could be disposed within sections 96 and 97 and serve as means for automatically extending telescoping section 97 with respect to sleeve section 96.

A hydraulic actuator 104 is mounted at one end to a bracket 105 extending between cheek sections 74 of basket mounting assembly 72 and at the other end to a bracket 106 formed on the free or distal end of outer sleeve section 96 of jib assembly 92 for raising and lowering sections 96 and 97 about transverse axis 77 of pin 76.

A bracket member or extension 107 is included within jib assembly 92 and is formed with two longitudinally-extending spaced-apart parallel plates 108 formed on the proximal end thereof for disposition about the distal end of telescoping section 97. Extension 107 is pivotally mounted to section 97 by any suitable means such as second pivot means or stud shaft 110 which extends perpendicularly between plates 108 and is secured at each end thereto by any suitable means such as retaining rings 111. Stud shaft 110 extends through the distal end of telescoping section 97 along a second axis 112 so as to be also carried thereby. Extension 107 extends along a third axis 113 and in its at-home position, as shown in the drawings, axis 113 is coincident with longitudinal axis 98. Stud shaft axis 112 is aligned perpendicular to axes 98 and 113 and transverse axis 77.

Means is carried by plates 108 and telescoping section 97 for manually adjusting the relative angular position of extension 107 and section 97 about axis 112 and, as shown in FIGS. 4 and 5, consists of a ball lock pin 114 which is adapted to be disposed within one of the pairs of aligned bores 116 extending through plates 108 and a bore 117 extending transversely through telescoping section 97. By removal of pin 114, it can be seen that extension 107 can be pivoted about axis 112 with respect to sections 96 and 97. Insertion of the pin into aligned bores 116 and 117 holds extension 107 and sections 96 and 97 in a predetermined fixed angular relationship. Pairs of aligned bores 116 are circumferentially spaced-apart about transverse axis 112 so as to permit extension 107 to be obliquely positioned at an angle up to approximately± 60° with respect to longitudinal axis 98.

Extension 107 has a distal end which is pivotable from side to side about stud shaft 110 and is formed with a flange plate 119 thereon. A pivot assembly 120 similar to that described in U.S. Pat. No. 3,300,191 is mounted to flange plate 119 (See FIGS. 4 and 6) and includes a first support member 121 having a boss portion 121a. Support member 121 is joined to flange plate 119 by any suitable means such as bolts 122 which seat within the boss portion and threadedly engage cooperatively aligned threaded bores 123 in the flange plate. Boss portion 121a extends along and is axially centered on third axis 113 and serves as third pivot means. A second support member 124 is carried by first support member 121 and is provided with a central bore 124 which permits second support member 124 to be disposed around boss portion 121a of the first support member and to pivot and rotate about third axis 113. Second support member 124 is secured to first support member 121 by a clip ring 126 which is mounted within an annular groove around boss portion 121a and bears upon the outer surface of support member 124. In this manner, support members 121 and 124 are held in respective planes which are substantially at right angles to third axis 113.

As shown in FIG. 6, second support member 124 is provided with a plurality of holes or bores 127 which are circumferentially spaced-apart about third axis 113. A spring loaded pin 128 is slidably mounted to the periphery of first support member 121 along an axis generally parallel to axis 113 and is adapted to be seated within one of bores 127. Pin 128 and bores 127 are included within the means for manually locking second support member 124 in a predetermined angular relationship about third axis 113 with respect to first support member 121. An eye bolt 129 threadedly extends into support members 124 and 121 along third axis 113 and serves as an anchor for attaching objects to jib assembly 92.

Fairlead assembly 91 is pivotally carried by second support member 124 as illustrated in FIGS. 4 through 6. In this regard, second support member 124 is provided with a flanged upper portion in the form of disk plate 124a which is aligned generally perpendicular to the rotation plane of support member 124. Fairlead assembly 91 includes a third support member 131 provided with a flanged lower portion in the form of rectangular plate 132 which rests on the top of disk plate 124a. Support member 131 and plate 124a are provided with centrally aligned bores therethrough for pivotably carrying a stud shaft 133 which extends perpendicularly from plates 132 and 124a along a fourth axis 134 disposed at a right angle to third axis 113. Stud shaft 133 serves as fourth pivot means and is secured at it top end by a retaining ring 136 mounted in an annular groove therearound and bearing against the top of support member 131 and at its bottom end by a retaining ring 136 similarly mounted to the stud shaft and bearing against the bottom of plate 124a.

Rectangular plate 132 has a length approximately equal to the diameter of disk plate 124a and is provided with longitudinally opposed angular alignment bores 137 which extend through each end thereof. Disk plate 124a is provided with a plurality of alignment bores 138 which are circumferentially spaced-apart about fourth stud shaft 133 and in radial alignment with bores 137 on the rectangular plate. A ball lock pin 139 can be disposed in an aligned pair of bores 137 and 138 for locking third support member 131 in a predetermined angular position relative to second support member 124. Alignment bores 137 and 138 and pin 139 are included within the means for manually adjusting the relative angular position of fairlead assembly 91 and support member 124 about axis 134. It should be appreciated that the fairlead assembly can free spool about fourth axis 134 if plates 132 and 124a are not rotationally locked with pin 139.

Fairlead assembly 91 is substantially similar to the fairlead assembly described in U.S. Pat. No. 3,300,191 and includes a pair of vertically disposed spaced-apart parallel rollers 141 rotatably mounted on pins 142 by any suitable means such as bushings (not shown). Pins 142 have their lowermost ends snugly disposed in vertical bores provided in third support member 131 and retained therein by any suitable means such as set screws. A pair of additional rollers 143 and 146 are disposed on opposite sides of the bottoms of rollers 141 and extend at substantially right angles thereto. Rollers 143 and 146 are each longitudinally sized so that they have portions which overlap rollers 141 and are mounted on bushings (not shown) rotatably mounted upon shafts 147. One end of each shaft 147 is rigidly mounted to a first arm 151 and the second end of each shaft 147 is mounted to a second arm 152 by a nut 153. Arms 151 and 152 are substantially Z-shaped and have portions intermediate the ends thereof which are pivotally mounted upon third support member 131 by suitable means such as stud shafts 156 affixed to upstanding spaced-apart ears 157 provided on the third support member. Nuts 158 retain arms 151 and 152 on stud shafts 156. In this manner, arms 151 and 152 are mounted for pivotal movement about a horizontal axis which is perpendicular to the axis of vertical rollers 141 and parallel to the axis of roller shafts 147.

Fairlead assembly 91 includes a single additional roller 161. Means is provided, as disclosed in U.S. Pat. No. 3,300,191, for mounting roller 161 for movement between an open position in which the cable can be inserted between rollers 141 and placed upon rollers 143 and 146 and in a closed position in which roller 161 extends between rollers 141 in a direction at right angles to the rotation thereof and is spaced from and is substantially parallel to rollers 143 and 146. In this closed position, portions of roller 161 overlap portions of rollers 141. This mounting means includes a mounting member 162 which is provided with depending ears 163. Roller 161 is mounted upon bushings (not shown) which are rotatably mounted on a roller shaft 166 extending between depending ears 163. Roller shaft 166 is mounted to the depending ears and secured thereto by nuts 167. Mounting member 162 is pivotally mounted at one end to the upper end of one roller pin 142 and is removably mounted at its other end to the upper end of the other roller pin 142.

As can be seen from the foregoing, jib assembly 92 permits considerable flexibility in positioning fairlead assembly 91 when placing cable and permits adjustment or movement of the fairlead assembly about four axes. In this regard, the extensible member 95 permits fairlead assembly 91 to be extended along longitudinal axis 98 from a retracted position, shown in solid lines in FIG. 2, to an extended position, shown in dotted-lines in FIG. 2. The fairlead assembly can be raised and lowered about first axis 77, swung from side to side about second 112, rotated about third axis 113 and pivoted about fourth axis 134. Hydraulic actuators 78 and 104 are included within the means for raising and lowering fairlead assembly 91 from its at home position, shown generally in solid lines in FIG. 1, to an operational position, shown generally in solid lines in FIG. 2. Extension 107 and support members 121, 124 and 131 are included within the means for pivotably coupling the fairlead assembly to stud shaft 110 for permitting the fairlead assembly to swing from side to side thereabout. Hydraulic actuator 104 is also included within the means for establishing a predetermined position and elevation of fairlead assembly 91 above basket 70, while hydraulic actuator 78 is also included within the means coupled to basket 70 and fairlead assembly 91 for causing simultaneous movement of the fairlead assembly as the basket is leveled.

Vehicle 21 is capable of carrying a strand reel 171 and includes a support assembly 172 disposed forward of lifting equipment 46 which serves as means mounted on vehicle 21 for rotatably supporting the strand reel. As known to those skilled in the art, cable from reel 36 can be lashed to strand prior to placement.

A bullwheel assembly 176 is mounted to platform 31 forward of strand support assembly 172 for guiding cable from reel 36 as it is being placed at boom structure outer end 57 (See FIG. 1 and 8 through 10). Bullwheel assembly 176 includes upper and lower sections 177 and 178 and a framework 180 which is part of the means or assembly 181 for supporting upper section 177 with respect to lower section 178. Framework 180 is adapted for rigidly mounting on platform 31 by any suitable means such as welding or bolts not shown in the drawings. Lower bullwheel section 178 consists of a pair of parallel spaced side plates 182 with outwardly turned flanges 183 and ribs 186 for reinforcement thereof. Side plates 182 are joined by spacers 187. A plurality of pulleys or rollers 191, and as shown in the drawings three rollers 191, are mounted to side plates 182 for rotation therebetween on parallel axes generally perpendicular to the side plates to provide a substantially arcuate path for guiding the cable therethrough. A pair of side guide rollers 192 are rotatably mounted to side plates 182 for rotation about axes generally perpendicular to the rotation axes of pulleys 191 for further guiding the cable through lower bullwheel section 178. Means for carrying and mounting lower bullwheel section 178 to framework 180 includes bolts 193 which extend through a portion of the framework, through side plates 182 and through spacers 187 or pulleys 191. Nuts 196 are threadedly secured to the ends of bolts 193.

Upper bullwheel section 177 includes a pair of parallel spaced side plates 202 having outer flanges and ribs similar to flanges 183 and ribs 186 which, for simplicity, are not shown in the drawings. Side plates 202 are joined by spacers 207 extending perpendicularly therebetween and a pivot or hinge housing 211 disposed along the backside of bullwheel section 177. A plurality of pulleys or rollers 212, and as shown in the drawings four rollers 212, are mounted to side plates 202 for rotation about parallel axles 213 extending therebetween generally perpendicular to the side plates. Rollers 212 are positioned so that they form an arc for guiding the cable received from lower bullwheel section 178 through upper bullwheel section 177. A plurality of additional roller means or rollers 214, and as shown in the drawings three rollers 214, are rotatably mounted to spacers 207 by any suitable means such as bushings (not shown). Rollers or sheaves 214 are smaller in size than rollers 212 and are positioned so as to form an arc inside the arc of rollers 212 for guiding a towline connected to an offboard lashing apparatus. Since the cable follows the outside arc of rollers 212, the towline can be positioned close to the inside of rollers 212 and pass between the side guide portions of each roller 212.

Bullwheel support assembly 181 includes first and second longitudinally-extending hollow members 222 and 223 which assist in carrying upper bullwheel section 177 on framework 180. Members 222 and 223 serve as part of the means for elevating upper bullwheel section 177 along axis 224 from a lower position with respect to lower bullwheel section 178, shown in solid lines in FIG. 8, to an upper position with respect to the lower bullwheel section, shown in dotted lines in FIG. 8, to provide additional clearance for the cable passing therefrom. In this regard, a hydraulic actuator 224 is disposed within sections 222 and 223 for causing extensible member 223 to extend along a generally vertical axis 227 and is mounted to framework 180 with the aid of a pair of upstanding base arms 228 joined to the framework. A pin 231 is mounted at each end to bores in base arms 228 and extends perpendicularly between the base arms and through a transversely-aligned bore 232 provided on the bottom end of actuator 224. Member 222 has an open bottom end which is bolted or otherwise suitably joined to framework 180 and has an enlarged housing 233 formed thereon for disposition around U-brackets 228.

Member 223 is slidably carried about member 222 and has an open bottom end for receiving member 222 and an open top end for carrying an attachment plate 236. A pair of arms 237 depend downwardly from plate 236 into member 223 and a pin 241 is mounted at each end to bores provided in arms 237 and extends perpendicularly therebetween through a transversely-aligned bore 242 provided on the top end of actuator 224. A cap plate 243 overlies plate 236 and plates 236 and 243 are secured to the top end of member 223 by any suitable means such as bolts not shown in the drawings. Members 222 and 223 each have square cross-sectional configurations, as illustrated in FIG. 10, which serve as means for restricting rotation of upper bullwheel section 177 about axis 224.

Bullwheel support assembly 181 further includes means for castering upper bullwheel section 177 with respect to lower bullwheel section 178 and, in this regard, has two vertically spaced-apart arms 246 mounted to the outside of member 223 and extending horizontally therefrom for engagement with the top and bottom of hinge housing 211. A generally vertically disposed pin 247 extends through aligned bores in arms 246 and is rotatably mounted in the hinge housing by bushings not shown in the drawings. Pin 247 has opposite threaded ends which extend beyond arms 246 and have nuts 248 threadedly mounted thereon for securing the pin to the arms.

A conventional cable lashing apparatus or lasher 253, such as the Type "J" Model 2 GMP cable lasher made by General Machine Products of Trevoise, Pa. which can be mounted on aerial placed strand for lashing cable thereto, can be removably mounted to bullwheel assembly 176 for use as a prelasher as illustrated in FIGS. 8 and 9. Lasher 253 has a housing 254 and can be fitted with an adapter or tang 255 such as the adapter for three roller cable guide marketed by General Cable Company of Westminister, Colo. Vehicle 21 has mounting means for mounting lasher 253 to upper bullwheel section 177 which includes mounting or rack assembly 257 having a lower portion consisting of elongate arm members 258 and an upper portion consisting of carriage 259. Arm members 258 are made of any suitable material such as metal and extend along opposite sides of upper bullwheel section 177. The arm members are each provided with upstanding tab portions 260 near the center thereof. Axle 213 for the lowermost roller 212 in the upper bullwheel section has opposite outer portions 261 which extend outwardly beyond each side of side plates 202 along a first horizontal axis 262 and serve as first pivot means for pivotably mounting the lower end of each arm member 258 to bullwheel section 177 so that rack assembly 257 and lasher 253 carried thereby can pivot in opposite directions about axis 262. Arm members 258 are provided with bores therein through which axle outer portions 261 extend and are secured to portions 261 by any suitable manner such as retaining rings 266.

Carriage 259 is made of any suitable material such as metal and serves as a support member for carrying lasher 253. The carriage is formed with a body portion 267 having upstanding portions 268 forming each side thereof. Downwardly depending tabs 271 are provided on each side of one end of body portion 266 in transverse alignment with the upper ends of arm members 258. First and second bolts 272 extend through respective arm members 258 and tabs 268 along a second horizontal axis 276 and serve as second pivot means for pivotably coupling and connecting arm members 258 and carriage 259 together so that lasher 253 can pivot in opposite directions about axis 276 relative to upper bullwheel section 177. Knobs 273 are cooperatively threaded to the ends of bolts 272 for securing them to the arm members and carriage.

Carriage 259 is provided with first and second fork elements 277 which extend longitudinally outwardly from body portion 267 along each side of the front thereof for carrying lasher 253. Fork elements 277 each have a bottom portion and opposite side portions so as to be elbow-shaped in cross section and cooperatively engage within lasher housing 254 so as to support lasher 253. Body portion 267 has a front cross member 278 which extends between the top of side portions 268 and has depending tabs 281 on the center thereof for accepting lasher tang 255. A ball lock pin 282 extends through and between tabs 281 so as to engage a bore in tang 255 and secure the lasher to the rack assembly. Tabs 281 and pin 282 are included within the coupling means of assembly 257 for permitting lasher 253 to be decoupled therefrom for use independent of bullwheel assembly 176.

Bullwheel assembly 176 is provided with first limit means in the form of stop blocks 286 for limiting the downward pivotal movement of arm members 258 about axis 262. Blocks 286 are mounted in transverse alignment near the bottom of upper bullwheel section 177 and extend outwardly from each of side plates 202 so as to engage the arm members as they pivot downwardly and preclude them from extending further downwardly.

Rack assembly 257 includes counterbalancing means for offsetting the weight of lasher 253 about axis 276 when arm members 258 are in limiting engagement with stop blocks 286. In this regard, body portion 267 has a back cross member 287 which extends between the top of side portions 268. First and second spring means in the form of coil springs 288 have one end mounted at each end of cross member 287 adjacent the respective side portion 268 and the other end mounted to the upstanding tab portion 260 of the respective arm member 258. Springs 288 are sized to accommodate the lasher 253, which can range in weight from 45 to 60 lbs. It should be appreciated that other counterbalancing means such as weights could be used and be within the scope of the present invention.

Second limit means in the form of first and second stop fins 291 are included within rack assembly 257 for limiting the upward pivoting movement of carriage 259 about axis 276. Fins 291 extend rearwardly from body portion 267 and inwardly toward each other at a positive oblique angle from the transverse plane of the body portion so as to engage the tops of arm members 258 when carriage 259 pivots upwardly about axis 276 to a position in general linear alignment with arm members 258, as shown in dotted lines in FIG. 8. Once the carriage and arm members have reached this relative relationship, further upward pivoting of lasher 253 occurs about axis 262.

An idler roller 296 extends transversely across carriage 259 and is rotatably mounted to side portions 268 thereof for transposing strand 297 and cable 298 for correct entry into lasher 253. As can be seen in FIG. 8, where strand 297 and cable 298 are shown in dotted lines traveling through upper bullwheel section 177 and lasher 253, strand 297 goes over and cable 298 under idler roller 296 prior to entering the lasher. Lasher 253 lashes the cable to the strand with cable lashing wire 299 prior to aerial placement.

In operation and use of the method and apparatus of the present invention, vehicle 21 permits boom structure 51 to be rotated about vertical axis 48 in a first direction so that outer end 57 is on one side 26 of vehicle 21 and cable 298 can be placed from fairlead assembly 91 on that side of the vehicle. If the operator wishes to then place cable on the other side 26 of vehicle 21, the operator causes hydraulic actuator 224 to extend second hollow member 223 upwardly about first hollow member 222 so as to raise upper bullwheel section 177 along axis 227 with respect to lower bullwheel section 178 so that the cable passing from the bullwheel assembly is elevated to a height above heel 54 of boom structure 51. The boom structure would then be rotated in an opposite second direction about axis 48 so that heel 54 passes beneath the cable as outer end 57 moves to the other side of the vehicle. Cable 298 can then be placed by fairlead assembly 91 on the other side of the vehicle.

Rack assembly 257 permits a lasher 253 to be easily mounted to bullwheel assembly 176 for use as a prelasher and later decoupled therefrom for use independent of the bullwheel assembly. The two pivot design of the rack assembly permits the lasher to easily follow the arc and find the tangent of cable 298 guided by the bullwheel assembly and passing through the lasher. When the cable is being placed at relatively high elevations, carriage 259 permits the lasher to pivot upwardly about generally horizontal axis 276 and minimize any binding or undesirable bends in the cable passing from lasher 253. If cable is placed at even higher elevations, stop fins 291 engage arm members 258 to cause the lasher and rack assembly 257 to pivot as a unit about generally horizontal axis 262. In certain of these situations, the bend of cable 298 will cause the cable to lift off rollers 212 in upper bullwheel section 177. Coil springs 288 facilitate the pivoting of the rack assembly by counterbalancing the weight of the lasher so that cable 298 need not provide the full force for pivoting the lasher upwardly and downwardly about axis 276.

Rack assembly 257 further permits lasher 253 to pivot downwardly when cable is being placed by outer end 57 at elevations which require the boom structure to pivot below horizontal. For example, if cable is being placed in a canyon off the side of the road on which vehicle 21 is traveling, the lasher and carriage can pivot downwardly below horizontal about axis 276. Stop blocks 286 restrict arm members 258 from pivoting about axis 262 below a height at which pivot bolts 272 connecting arm members 258 and carriage 259 are below the rotation axis of the uppermost cable roller 212 in upper bullwheel section 177. As a result, extreme bends in cable 298 passing from bullwheel section 177 to lasher 253 are avoided. The directions of the carriage's pivotal movement about axis 276 are shown with the rack assembly drawn in solid lines in FIG. 8; the directions of the rack assembly's pivotal movement about axis 262 are shown with the rack assembly drawn in dotted lines in FIG. 8.

If prelashing is not required, ball lock pin 282 can be easily disengaged from depending tabs 281 to release lasher tang 255 and permit lasher 253 to be decoupled and removed from rack assembly 257. Carriage 259 can be removed from arm members 258 by unscrewing knobs 273 and pulling interconnect bolts 272 which secure the carriage and arm members together. The carriage can then be stored on vehicle 21 until further use is required. Cable placement can then be accomplished without the unnecessary step of passing the cable through a prelasher.

If lashing cable 298 to aerially placed strand is required, a towline or towrope for towing the lasher riding on said strand can be guided by sheaves 214 in upper bullwheel section 177. Since the towline is carried by bullwheel assembly 176 and follows the cable during rotation of boom structure outer end 57 from one side of vehicle 21 to the other, the need to move the towline from one side of the vehicle to the other is alleviated when so switching cable placement from vehicle side to vehicle side.

Basket mounting assembly 72 permits the operator in basket 70 to be in a safe out-of-the-way position during placement of cable. In the method of the present invention, mounting assembly 72 permits the basket to be moved or swung to one side 63 or 64 of outer end 57 and cable 298 to be placed on the opposite side 64 or 63 of the outer end. By so positioning basket 70, the operator therein can stay out of the bight, that is the area inside the angle of the cable passing through fairlead assembly 91, and out of the area beneath the fairlead assembly. These areas can be extremely dangerous to an operator positioned therein should the cable slip out of the fairlead assembly. If the operator later wishes to swing boom structure outer end 57 to the other side of vehicle 21 for placing cable therealong, basket 70 can be rotated to the opposite side 64 or 63 of outer end 57 and cable thereafter placed on side 63 or 64 of the outer end. When rotating the basket from side to side of outer end 57, actuator 104 permits fairlead assembly 91 to be raised so as to facilitate the operator passing thereunder and provide additional clearance between the cable and basket.

Fairlead assembly 91 is carried by outer end 57 of boom structure 51 for receiving cable as it is payed from bullwheel assembly 176. The central fairlead design confines loading to fairlead assembly 91 and jib assembly 92. The fairlead assembly is not codependent with basket 70 and the forces carried by the fairlead assembly are not supported by the basket. Instead, the indeterminate loads imposed by outer limit cable placing are transmitted through actuators 104 and 78 so as to be carried by boom structure outer end 57. Jib assembly 92 permits omnidirectional fairlead assembly 91 to be adjusted about four axes and to be telescoped outwardly along another axis when positioning the fairlead assembly for placement of cable.

The positioning of basket 70 and operator on the opposite side of outer end 57 form which cable 298 is being placed provides additional reach to fairlead assembly 91 for guiding the cable being placed by permitting it to be moved closer to the point of placement. In addition, basket mounting assembly 72 facilitates optimizing the reach of boom structure 51 without need of moving fairlead assembly 91 as weighted by the cable passing therethrough when transferring cable from one side 26 of vehicle 21 to the other.

Fairlead assembly 91 can move in unison with basket 70 about pin 76 during leveling of the basket. As a result, the relative relationship of the fairlead assembly to the basket and the operator therein can be maintained as the basket is positioned for cable placement. If further elevational adjustment of the fairlead assembly is required, actuator 104 can cause the fairlead assembly to pivot upwardly or downwardly about pin 76 independent of the basket.

From the foregoing it can be seen that a new and improved apparatus for the placement of aerial cable has been provided. The apparatus is particularly adapted for use in placing relatively large and heavy cables and can place cable a distance from the pavement sufficient to meet governmental regulations. The apparatus includes a bullwheel assembly which can be elevated to permit the cable to clear the heel of the boom structure when passing from one side thereof to the other. A rack assembly is provided for pivotably mounting a lashing apparatus to the bullwheel assembly so that the lashing apparatus approximates the arc of the cable passing from the bullwheel assembly and through the lashing apparatus. The lashing apparatus can be decoupled from the bullwheel assembly for use on aerial placed strand for lashing cable thereto. During offboard lashing, the apparatus does not require the towline to be disconnected and reattached to the vehicle when moving cable placement from one side of the vehicle to the other.

A worker's platform is mounted to the end of the boom structure and can be moved or rotated from one side of the boom structure to the other so as to provide the boom structure with additional reach. The apparatus has a fairlead assembly mounted to the end of the boom structure which can be adjusted with respect to four axes to facilitate the reach of the boom structure.

What is claimed is:

1. In an apparatus for placement of aerial cable from a cable reel, a wheeled platform having a front and rear, a boom structure having an axially-extending outer end, a worker's platform, means mounting the worker's platform on the outer end of the boom structure, a boom support structure carrying the boom structure and rotatably mounted on the wheeled platform for rotation about a vertical axis, the boom structure and the boom support structure being constructed to permit the worker's platform to be moved toward and away from the wheeled platform, raised and lowered with respect to the wheeled platform and rotated with respect to the wheeled platform, means mounted on the wheeled platform adapted to support the cable reel at the rear of the wheeled platform, a bullwheel assembly mounted on the wheeled platform forward of the boom support structure for guiding cable from the cable reel, the bullwheel assembly having upper and lower sections and means for supporting the upper section with respect to the lower section to permit castering of the upper section with respect to the lower section, the means for supporting the upper section with respect to the lower section including means for elevating the upper section relative to the lower section to provide additional clearance for the cable passing from the bullwheel assembly.

2. An apparatus as in claim 1 wherein the means for elevating the upper section of the bullwheel assembly elevates the upper section along an axis and includes means for restricting rotation of the upper section about the axis.

3. In an apparatus for placement of aerial cable from a cable reel for use with a lashing apparatus and a strand reel, a wheeled platform having a front and rear, a boom structure having an axially-extending outer end, a worker's platform, means mounting the worker's platform on the outer end of the boom structure, a boom support structure carrying the boom structure and rotatably mounted on the wheeled platform for rotation about a vertical axis, the boom structure and the boom support structure being constructed to permit the worker's platform to be moved toward and away from the wheeled platform, raised and lowered with respect to the wheeled platform and rotated with respect to the wheeled platform, means mounted on the wheeled platform adapted to support the cable reel at the rear of the wheeled platform, a bullwheel assembly mounted on the wheeled platform forward of the boom support structure for guiding cable from the cable reel and having upper and lower sections, means for supporting the upper section of the bullwheel assembly with respect to the lower section to permit castering of the upper section with respect to the lower section, means mounted on the wheeled platform adapted to support the strand reel and mounting means adapted to mount the lashing apparatus to the upper section of the bullwheel assembly which permits the lashing apparatus to pivot upwardly and downwardly about a horizontal axis so as to follow the arc of the cable passing from the bullwheel assembly through the lashing apparatus.

4. An apparatus as in claim 3 wherein said mounting means includes a rack assembly for carrying the lashing apparatus and pivot means for pivotably coupling the rack assembly to said upper section.

5. An apparatus as in claim 4 wherein the rack assembly has first and second portions and a second pivot means for pivotably coupling the portions together so that the lashing apparatus can pivot upwardly and downwardly about a second horizontal axis relative to said upper section.

6. An apparatus as in claim 5 together with counterbalancing means carried by the first and second portions for offsetting the weight of the lashing apparatus.

7. An apparatus as in claim 1 for use with an offboard lashing apparatus connected to a towline wherein the apparatus further comprises roller means carried by said upper section for guiding the towline during the placement of cable.

8. In an apparatus for placement of aerial cable from a cable reel for use with a lashing apparatus and a strand reel, a wheeled platform having a front and rear, a boom structure having an axially-extending outer end, a worker's platform, means mounting the worker's platform on the outer end of the boom structure, a boom support structure carrying the boom structure and rotatably mounted on the wheeled platform for rotation about a vertical axis, the boom structure and the boom support structure being constructed to permit the worker's platform to be moved toward and away from the wheeled platform, raised and lowered with respect to the wheeled platform and rotated with respect to the wheeled platform, means mounted on the wheeled platform adapted to support the cable reel at the rear of the wheeled platform, a bullwheel assembly mounted on the wheeled platform forward of the boom support structure for guiding cable from the cable reel, the bullwheel assembly having upper and lower sections and means for supporting the upper section with respect to the lower section to permit castering of the upper section with respect to the lower section, means mounted on the wheeled platform adapted to support the strand reel and mounting means adapted to mount the lashing apparatus to the upper section of the bullwheel assembly, said mounting means including coupling means for permitting the lashing apparatus to be decoupled and used on aerial strand for lashing cable thereto.

9. In an apparatus for placement of aerial cable from a cable reel, a wheeled platform having spaced-apart first and second sides and a front and rear, a boom support structure mounted on the wheeled platform for rotation about a vertical axis, a boom structure carried by the boom support structure and having an axially-extending outer end with transversely spaced-apart opposite first and second sides, a worker's platform, means mounting the worker's platform on the outer end of the boom structure, the boom support structure and the boom structure being constructed to permit the worker's platform to be moved toward and away from the wheeled platform, raised and lowered with respect to the wheeled platform and rotated with respect to the wheeled platform, means mounted on the wheeled platform adapted to support the cable reel at the rear of the wheeled platform, a fairlead assembly for guiding cable as it is being placed and means mounting the fairlead assembly on the outer end of the boom structure in the vicinity of the worker's platform, the means mounting the worker's platform on the outer end permitting the worker's platform to be disposed on the first side of the outer end and including means for moving the worker's platform about an axis spaced sufficiently from the worker's platform so that the worker's platform moves beneath the fairlead assembly to the second side of the outer end.

10. An apparatus as in claim 9 wherein the means for moving the worker's platform from the first side of the outer end to the second side includes a basket rotator.

11. An apparatus as in claim 9 together with means for establishing a position and elevation of the fairlead assembly above the worker's platform and means coupled to the worker's platform and the fairlead assembly for causing simultaneous elevational movement of the fairlead assembly as the worker's platform is leveled.

12. In an apparatus for placement of aerial cable from a cable reel, a wheeled platform having first and second sides and a front and rear, a boom support structure mounted on the wheeled platform for rotation about a vertical axis, a boom structure carried by the boom support structure and having an axially-extending outer end, a worker's platform, means mounting the worker's platform on the outer end of the boom structure, the boom support structure and the boom structure being constructed to permit the worker's platform to be moved toward and away from the wheeled platform, raised and lowered with respect to the wheeled platform and rotated with respect to the wheeled platform, means mounted on the wheeled platform adapted to support the cable reel at the rear of the wheeled platform, a fairlead assembly for guiding cable as it is being placed and means mounting the fairlead assembly on the outer end of the boom structure in the vicinity of the worker's platform, the means mounting the fairlead assembly on the outer end of the boom structure including first pivot means transversely carried by the outer end, an axially-extending member having first and second ends and coupled at the first end to the first pivot means so as to be pivotable at the second end upwardly and downwardly about the first pivot means, second pivot means carried by the second end of the axially-extending member and extending along an axis perpendicular to the axis of the member and means for pivotably coupling the fairlead assembly to the second pivot means so as to permit the fairlead assembly to swing from side to side about the axis of the second pivot means.

13. An apparatus as in claim 12 wherein the means for pivotably coupling the fairlead assembly to the second pivot means includes at least one plate member, the axially-extending member and the plate member having means for adjusting the relative angular positions of said members about the axis of the second pivot means.

14. An apparatus as in claim 12 wherein the means mounting the fairlead assembly on the outer end of the boom structure includes first pivot means carried transversely by the outer end and extending along a first axis, a first member having first and second ends and pivotably coupled at the first end to the first pivot means so as to be pivotable at the second end upwardly and downwardly about the first axis, second pivot means extending along a second axis perpendicularly carried by the second end of the first member, a second member having first and second ends and pivotably coupled at the first end to the second pivot means and extending along a third axis perpendicular to the second axis so as to be pivotable at the second end from side to side about the second axis, third pivot means carried by the second end of the second member and extending along the third axis, a support member pivotably coupled to the third pivot means so as to be pivotable about the third axis and fourth pivot means carried by the support member and extending along a fourth axis perpendicular to the third axis, an additional support member pivotably coupling the fairlead assembly to the fourth pivot means, whereby the mounting means permits considerable flexibility in positioning the fairlead assembly when placing cable by permitting the fairlead assembly to be raised and lowered about the first axis, swung from side to side about the second axis, rotated about the third axis and pivoted about the fourth axis.

15. An apparatus as in claim 14 wherein the support members carry means for locking the fairlead assembly in a predetermined angular position about the fourth pivot means.

16. In an apparatus for placement of aerial cable from a cable reel, a wheeled platform having spaced-apart first and second sides and a front and rear, a boom support structure mounted on the wheeled platform for rotation about a vertical axis, a boom structure carried by the boom support structure and having an axially-extending outer end, a worker's platform, means mounting the worker's platform on the outer end of the boom structure, the boom support structure and the boom structure being constructed to permit the worker's platform to be moved toward and away from the wheeled platform, raised and lowered with respect to the wheeled platform and rotated with respect to the wheeled platform, means mounted on the wheeled platform adapted to support the cable reel at the rear of the wheeled platform, a fairlead assembly for guiding cable as it is being placed and means mounting the fairlead assembly on the outer end of the boom structure in the vicinity of the worker's platform, the means mounting the fairlead assembly on the outer end of the boom structure including first pivot means transversely carried by the outer end, an axially-extending member having first and second ends and coupled at the first end to the first pivot means so as to be pivotable at the second end upwardly and downwardly about the first pivot means, second pivot means carried by the second end of the axially-extending member and means for pivotably coupling the fairlead assembly to the second pivot means so as to permit the fairlead assembly to move from first and second transversely spaced apart positions about the second end of the axially-extending member.

17. An apparatus as in claim 16 wherein the axially-extending member is extendable between a first contracted position and a second extended position.

18. An apparatus as in claim 16 wherein the means for pivotably coupling the fairlead assembly to the second pivot means includes a second member having first and second ends and extending along a third axis, third pivot means carried by the second end of the second member and extending along the third axis, a support member pivotably coupled to the third pivot means so as to be pivotable about the third axis, fourth pivot means carried by the support member and extending along a fourth axis perpendicular to the third axis and an additional support member pivotably coupling the fairlead assembly to the fourth pivot means.

* * * * *

UNITED STATES PATENT AND TRADEMARK OFFICE
CERTIFICATE OF CORRECTION

PATENT NO. : 5,452,879
DATED : September 26, 1995
INVENTOR(S) : LEON KONONOV; ROBERT A. YOUNG It is certified that error appears in the above-indentified patent and that said Letters Patent is hereby corrected as shown below:

On the title page, item [73] Assignee, should read:

Mobile Tool International, Inc.
    Westminster, Colorado

Signed and Sealed this

Thirtieth Day of July, 1996

Attest:

BRUCE LEHMAN

*Attesting Officer*      Commissioner of Patents and Trademarks